(No Model.)
H. AMORY.
Electric Signal Bell.
No. 228,851. Patented June 15, 1880.
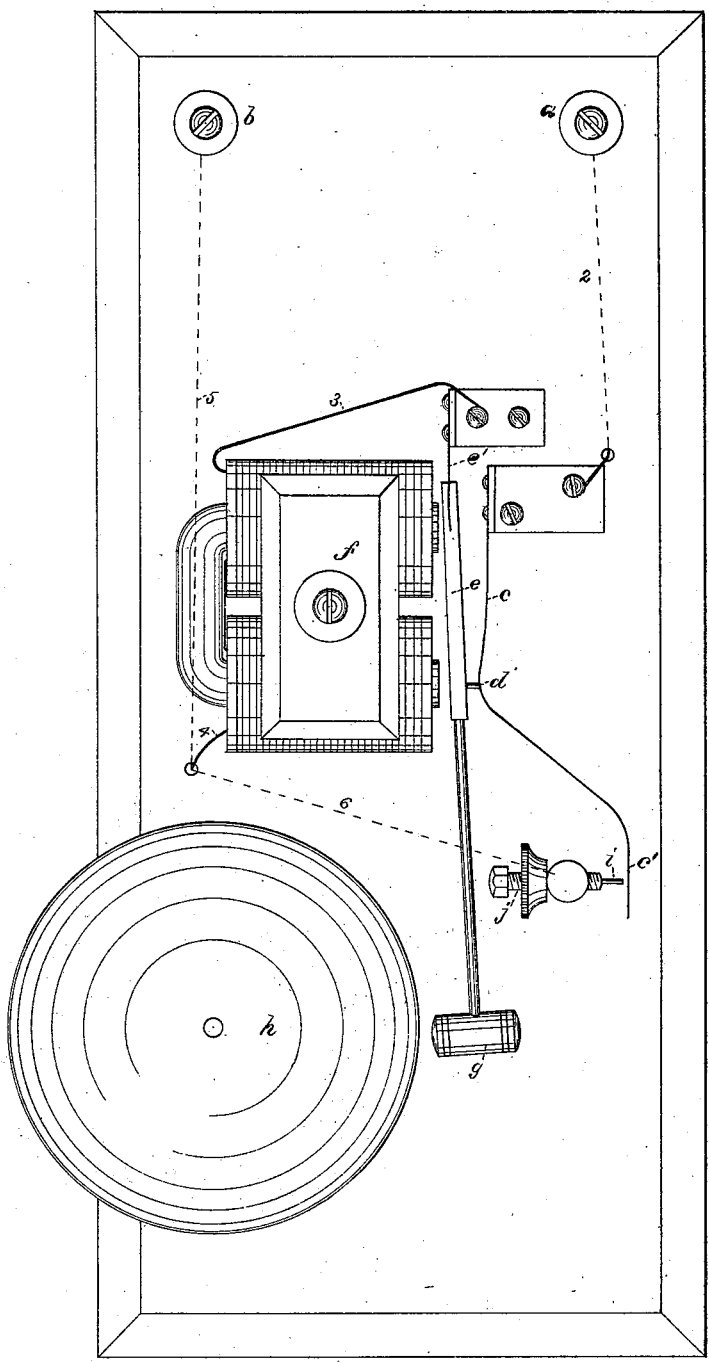
WITNESSES
L. F. Connor
A. Reynolds
INVENTOR
Harcourt Amory
By Crosby & Gregory Atty.

UNITED STATES PATENT OFFICE.

HARCOURT AMORY, OF BOSTON, MASSACHUSETTS.

ELECTRIC SIGNAL-BELL.

SPECIFICATION forming part of Letters Patent No. 228,851, dated June 15, 1880.

Application filed April 12, 1880. (No model.)

*To all whom it may concern:*

Be it known that I, HARCOURT AMORY, of Boston, county of Suffolk, State of Massachusetts, have invented an Improvement in Electric Signal-Bells, of which the following description, in connection with the accompanying drawing, is a specification.

My invention relates to signal-bells, and is shown embodied in a vibrating or automatic circuit-breaking bell, and has for its object to operate a vibrating bell or circuit-breaker without ever wholly opening the circuit in which the apparatus is placed.

My invention consists in accomplishing this result by causing a branch or shunt portion of the main circuit to be automatically closed at the same moment that another branch of the main circuit, passing through the coils of the operating-magnet, is broken. This arrangement enables the branch in which the magnet is placed to be automatically broken and closed to vibrate the armature in the usual manner without ever opening the main circuit exterior to the said apparatus, and the other or shunt branch just described, which may be called the "circuit-maintaining" branch, may, if desired, contain resistance-coils to the amount of those of the magnet, to thereby preserve a uniform current in the main circuit.

In the present embodiment of my invention a spring which forms a portion of the main circuit forms a back-stop for the armature of the operating-magnet, the said armature, when unattracted itself, forming a portion of the circuit, which is continued through the coils of the magnet, causing it to be magnetized and attract the armature away from the spring, thus breaking the circuit at that point in the usual manner.

When the armature is attracted its back contact-spring, pressing against it, follows it for a short distance until, just before the armature vibrates out of reach of the said spring to break the circuit of its magnet, as just described, the spring comes in contact with another point connected with a branch joining the main circuit beyond the coils of the magnet before described, thus retaining the main circuit closed, although the branch passing through the magnet is open to properly operate the armature.

When the armature has completed by its momentum its vibration toward the magnet, and, being no longer attracted, is moved back by the usual retracting power, it first comes in contact with the spring, thus throwing the magnet in circuit, and as it moves farther breaks the shunt-circuit, and causes the whole current to pass through the magnet, to repeat the operation just described.

It is obvious that the operation of the circuit-breaker or vibrating armature will be precisely the same as if the continuity branch-circuit were omitted, and it will operate a signal-bell or induction-coil, or any other desired apparatus with the same strength.

The drawing shows, in plan view, a signal-bell apparatus embodying my invention.

The main-circuit wires are connected at the binding-screws $a$ $b$. Passing from the former one, $a$, the circuit is over wire 2, spring $c$, through the contact-point $d$ thereon to the armature $e$ and its flexible supporting-spring $e'$, the normal tendency of which is to throw the armature back from the magnet, as shown in the drawing, and thence the circuit follows wire 3 through the coils of the magnet $f$, and continues by wires 4 5 to the screw $b$.

When a current is flowing and the parts in the position shown, the magnet $f$ will attract the armature and break the circuit at the point $d$, the hammer $g$, connected with the said armature, then striking the bell $h$. The armature will continue vibrating and ringing the bell as long as a current flows in the said circuit in the usual manner, and, as thus far described, my bell does not differ from many now in use.

The spring $c$ presses the point $d$ toward the armature $e$ and causes the said point to follow the armature, retaining the circuit closed during a considerable portion of the movement thereof toward the magnet.

Before the armature breaks the circuit of the magnet at the point $d$ the end $c'$ of the spring $c$ comes in contact with a point, $i$, shown as adjustable by the screw $j$, and connected by wire 6 with the wire 5 and screw $b$, so that when the circuit of the magnet $f$ is broken at $d$ the main circuit is still closed between the screws $a$ $b$, passing over wire 2, spring $c$, point $i$, and wires 6 5.

When the armature $e$ swings back from its magnet under the influence of its supporting-spring $e'$, the first-described circuit is closed at $d$, and then the branch circuit broken at $i$.

If desired, resistance may be placed in the wire 6 equal to that of the coils of the magnet $f$, and thus the current leading from the screws $a\ b$ may be kept not only unbroken but of uniform intensity.

The elasticity of the spring $c$ is such that the contact-pressure is gradually transferred from one of the points $d$ or $i$ to the other, so that the resistance of the said points remains about uniform. The fixed point of the spring $c$, upon which it vibrates, is shown as placed in such relation to that of the armature $e$ and to the fixed point $i$ that rubbing-contacts are always made at the points $d\ i$.

It is obvious that an automatic circuit-breaker or circuit-changer such as herein described, whereby when one branch of a main circuit is broken another branch is closed, and the main circuit thus continually preserved intact, may be useful for many other purposes besides ringing a vibrating alarm-bell.

I am aware that a vibrating bell has been provided with a shunt or short circuit which is closed when the armature has nearly completed its movement toward the magnet to divert the electricity from the magnet; but with such an arrangement the circuit of the magnet is not absolutely broken, and it is impossible to equalize the resistance to enable a steady current to be maintained in the main circuit, as may be done by the present invention.

I claim—

1. In an electrical apparatus, an automatic circuit-breaker adapted to automatically break one branch of a main circuit intermittingly, and at the same time close another branch, whereby the current is maintained uninterrupted, and, by making the resistance of the two branches equal, may be maintained of uniform intensity in the circuit outside the said branches, substantially as described.

2. An automatic circuit-breaker and an electro-magnet and its armature to operate it in one branch of a main circuit, combined with a second branch circuit adapted to be closed by the said circuit-breaker when the circuit through the magnet is broken, and broken when that through the magnet is closed in the vibrations of the armature, substantially as described.

3. In an electrical signal apparatus, an electro-magnet in one branch of a main circuit and a second branch of the said main circuit, combined with the armature and back contact-spring thereof, adapted in its movement caused by the vibration of the armature to intermittingly open and close the branches of the main circuit alternately, whereby the main circuit is never opened, but each of the branches thereof is intermittently opened and closed, and a magnet situated in either branch is enabled to operate a bell-hammer to ring an alarm, substantially as described.

In testimony whereof I have signed my name to this specification in the presence of two subscribing witnesses.

HARCOURT AMORY.

Witnesses:
 N. E. C. WHITNEY,
 JOS. P. LIVERMORE.